(12) United States Patent
Gazier et al.

(10) Patent No.: US 6,880,088 B1
(45) Date of Patent: Apr. 12, 2005

(54) SECURE MAINTENANCE MESSAGING IN A DIGITAL COMMUNICATIONS NETWORK

(75) Inventors: Michäel Gazier, Ontario (CA); Leo Strawczynski, Ottawa (CA)

(73) Assignee: Nortel Networks Limited, Ottawa (CA)

( * ) Notice: Subject to any disclaimer, the term of this patent is extended or adjusted under 35 U.S.C. 154(b) by 0 days.

(21) Appl. No.: 09/443,992

(22) Filed: Nov. 19, 1999

(51) Int. Cl.[7] .......................... G06F 11/30; G06F 12/14; H04L 9/00
(52) U.S. Cl. ....................... 713/201; 713/202
(58) Field of Search ................................ 713/201, 200, 713/170; 705/26, 182, 27, 51, 52; 707/201, 202, 203, 8, 10; 709/220

(56) References Cited

U.S. PATENT DOCUMENTS 6,029,164 A * 2/2000 Birrell et al. .................. 707/3
6,148,405 A * 11/2000 Liao et al. ................. 713/201
6,151,606 A * 11/2000 Mendez ...................... 707/201
6,463,418 B1 * 10/2002 Todd ............................ 705/26
6,587,874 B1 * 7/2003 Golla et al. ................. 709/220

* cited by examiner

*Primary Examiner*—Emmanuell L. Moise
(74) *Attorney, Agent, or Firm*—Finnegan, Henderson, Farabow, Garrett & Dunner, L.L.P.

(57) ABSTRACT

In an apparatus and method for performing secure messaging in a digital communications network, a module sends a registration message including an initial challenge and an identification of itself to the server. In response, the server sends a message, including a response to the module's challenge and a challenge to the module from the server, to the module based on the value and service of the initial challenge. The module uses the validity of the server's response to determine whether a transmitted message is authentic. A valid response corresponds to an authentic message. Alternatively, a server may initiate communications with a module. Once the initial communication is established, messaging typically continues for all transactions between the server and the module for one or more classes of transactions. The authentication process is repeated for each message.

52 Claims, 6 Drawing Sheets

SECURE MAINTENANCE MESSAGING IN A DIGITAL COMMUNICATIONS NETWORK

FIELD OF THE INVENTION

The present invention relates to apparatus and methods for transmitting secure messages in a digital communications network.

BACKGROUND OF THE INVENTION

In a distributed network, network-based devices or servers issue reset and other maintenance messages to remote modules. Similarly, remote modules provide status and other maintenance messages to the network-based servers. Typically, the servers and modules transmit these maintenance messages through a non-secure network in which other programs or agents may potentially tamper with or otherwise modify messages transmitted through the network. In a non-secure network, a remote module receiving a maintenance message may be unable to determine whether the message was altered in the network by a non-authorized agent. Likewise, when a remote module transmits a status or other message back to the server, the server may be unable to determine whether an entity in the network tampered with the message. Secure transmission also involves the need to protect messages from the insertion of spurious messages, the deletion of messages, the loss of messages, or the corruption of messages in the network. The inability to transmit secure maintenance messages, particularly reset commands, leaves a network vulnerable to both deleterious tampering and inadvertent action which may impact network performance. Accordingly, there exists a need for secure control of the transmission of messages in communications networks.

SUMMARY OF THE INVENTION

An apparatus consistent with the present invention receives a security message, including a challenge, from a remote module. The apparatus determines a response based upon the challenge, determines a next challenge, and transmits the response and the next challenge to the module.

Another apparatus consistent with the present invention transmits a security message, including a challenge, to a security device. The apparatus receives a next security message, including a response based upon the challenge from the device, and it determines a status of the next security message based on the validity of the response.

A method consistent with the present invention includes receiving a security message, including a challenge, from a module. A response based upon the challenge, and a next challenge, are determined and transmitted to the module.

Another method consistent with the present invention includes transmitting a security message, including a challenge, to a security device. The device transmits a next security message including a response based upon the challenge. The validity of the response determines the status of the next security message.

In accordance with a first aspect of the present invention, as embodied and broadly described herein, a system is provided for performing secure transmission of a message between a module and a device. The system includes a device, a module including a hardware interface capable of mutually authenticating maintenance messages to and from the device, and a network supporting communication between the device with the module. In one embodiment, a hardware interface operating in accordance with this aspect of the present invention is further capable of forcing hardware and software resets of the module.

Further, an apparatus operating in accordance with the first aspect of the present invention may be placed between the device and the module. This apparatus would in consequence have the untrusted network and the device on one side, and the module connected via a trusted network on the other side, e.g. across a shelf backplane. An example of the apparatus is a shelf controller for the module located on a the same shelf as the module. Accordingly, the apparatus can operate on behalf of, or as proxy agent, of the module receiving and sending the secure messages to the device, unbeknownst to the device. This is in accordance with the invention and achieves the equivalent functionality. The module's interface still implements the reset or other maintenance action(s) as instructed by the trusted (usually local) apparatus or proxy agent.

Further, a module operating in accordance with the present invention may generate, preferably from the module's interface hardware, on detection of hardware/software faults and other events in the module, status or other messages to the device or to the module's proxy agent which will relay the message to the device following the secure protocol described herein. In accordance with this invention, these messages are mutually authenticated.

A system operating in accordance with the proxy agent aspect of the present invention may further include a redundant proxy agent including a processor that performs validation and authentication of a maintenance message. A redundant proxy agent operating in accordance with the first aspect of the present invention receives, validates, and authenticates a maintenance message when the processor included in the proxy agent fails. Further, this redundant proxy agent forces reset of the main proxy agent when the processor in the proxy agent fails.

DETAILED DESCRIPTION

Apparatus and methods consistent with the present invention provide for secure messaging in redundant or non-redundant communications networks. Under this secure messaging scheme, all maintenance messages to remote modules from a server or proxy agent may be mutually validated and authenticated by a challenge/response protocol implemented by either the remote module's interface hardware or, where a module is associated with a local controller, the local controller. For purposes of this description, "challenge" includes information used to authenticate a transmitted message, and "response" includes information generated in response to a challenge, and particular criteria. This scheme also allows a remote module to generate and send authenticated status messages to a network server upon detection of hardware or software faults occurring in the remote module. As needed, the remote module's interface hardware may force hardware or software resets of the module, if ordered to do so by authenticated network server messages.

Transmitted secure messages typically include a challenge and a response to a previous challenge. A module or server may determine a response to its own challenge and compare that response with a received response. If they match, the message is secure or valid. Modules and servers usually include a next challenge with a response to reduce the number of separately transmitted messages, thereby increasing efficiency. The next challenges may be generated randomly i.e., non-deterministically, to further enhance the security of the authentication process for message transmission. This process of sending challenges and responses may repeat itself indefinitely, each end of a communications link transmitting challenges and responses to an entity at the other end of the link. Typically, each response message also contains a message or command. For example, a command may be used to instruct an entity at the other end of the communications link to reset itself. Verification of a response authenticates the transmitted message or command.

Communications Networks

Figure 1:
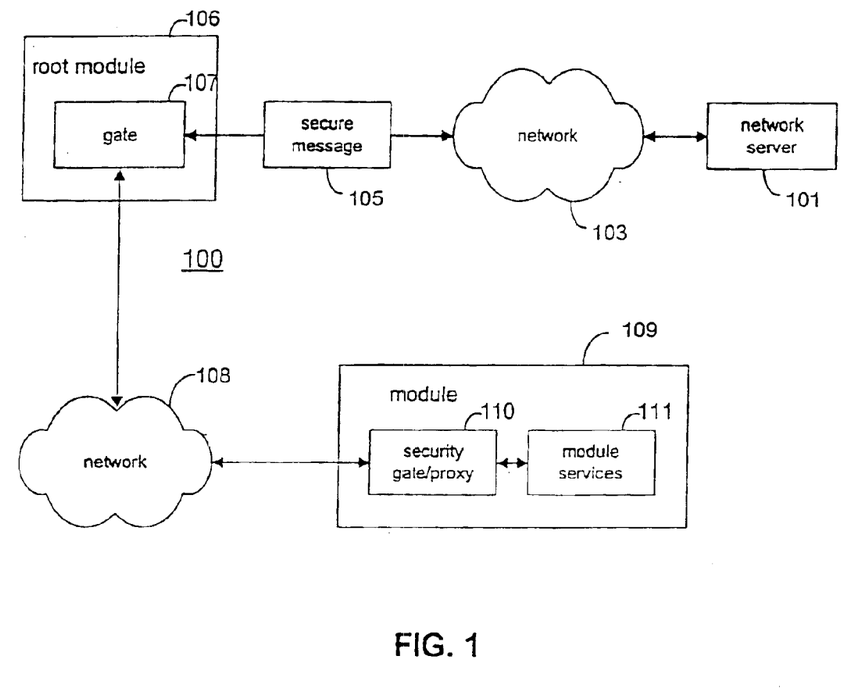
FIG. 1 is a block diagram of an exemplary communications network consistent with the principles of the present invention.

FIG. 1 is a block diagram of an exemplary communications network 100. It includes a network device or server 101 interfacing a network 103. Network 103 interfaces a root module 106 including a gate 107 for transmission (and reception) of a secure message 105 or other messages to (and from) other networks or modules. Root module 106 interfaces a remote module 109 through network 108. As shown, remote module 109 includes a security gate/proxy 110 interacting with module services 111. Proxy 110 may represent an embedded processor providing a communications link between a network and remote devices. Module services 111 may represent a processor for performing specific network functions.

Network server 101 may send a security message, such as message 105, through network 103, root module 106, and network 108, to remote module 109. Alternatively, messages may originate from remote module 109. Such messages may include, for example, maintenance messages for instructing a remote module to perform a particular operation. Root module 106 may represent, for example, a communications switch located in close physical proximity to remote module 109. Gate 107 thus may represent a switching apparatus for routing a message from server 101 to module 109 and vice versa.

Figure 2:
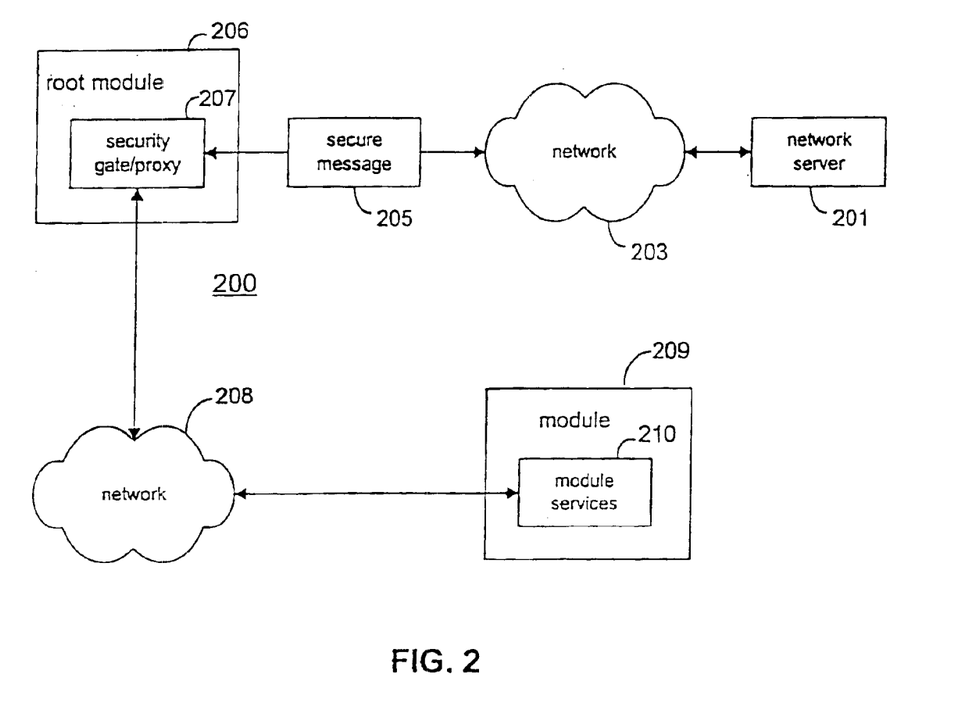
FIG. 2 is a block diagram of another exemplary communications network consistent with the principles of the present invention.

FIG. 2 is a diagram of another exemplary communications network 200 consistent with the present invention. Communications network 200 includes a network device or server 201 interfacing a root module 206 through a network 203. Root module 206 interfaces a remote module 209 through network 208. Network 208 must be a secure (trusted) network or direct link, otherwise the setup in FIG. 1 is required. Network server 201 may send a secure message 205 or other message through network 203, root module 206, and network 208 to remote module 209. In this example, root module 206 includes a security gate/proxy 207. Proxy 207 may represent an embedded processor providing a communications link between a network and remote devices. Remote module 209 includes module services 210 for performing various network operations. For example, module services 210 may represent a processor for performing particular functions for the network.

Network server 201 may send a security message, such as secure message 205, through network 203, root module 206, and network 208, to the remote module 209. Alternatively, messages may originate from remote module 209. A message may include, for example, maintenance messages for instructing a remote module to perform a particular operation. Secure messages transmitted to remote module 209 from network server 201 are routed through root module 206, because root module 206 functions as the security proxy for network 208. Root module 206 may represent a communications switch located in close physical proximity to remote module 209, for example, on the same shelf or in the same room. Gate 207 thus may represent a switching apparatus for routing a message from server 201 to module 209 and vice versa.

Servers 101 and 201 may be implemented with workstations or embedded processors in a network. Modules 109 and 209 may represent any type of peripheral device or component associated with a communications network. Networks 103, 108, 203, and 208 may represent any type of network providing communication between computers and related devices. Examples include the Internet and asynchronous transfer mode (ATM) networks.

Packet or Cell Structure

Figure 3:
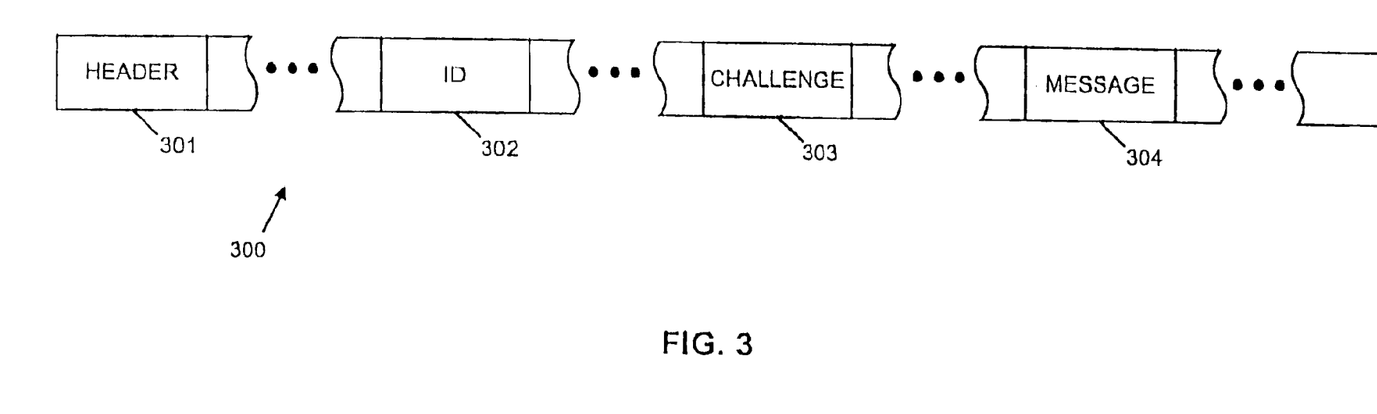
FIG. 3 is a diagram of a cell or packet for registration of a secure message.
Figure 4:
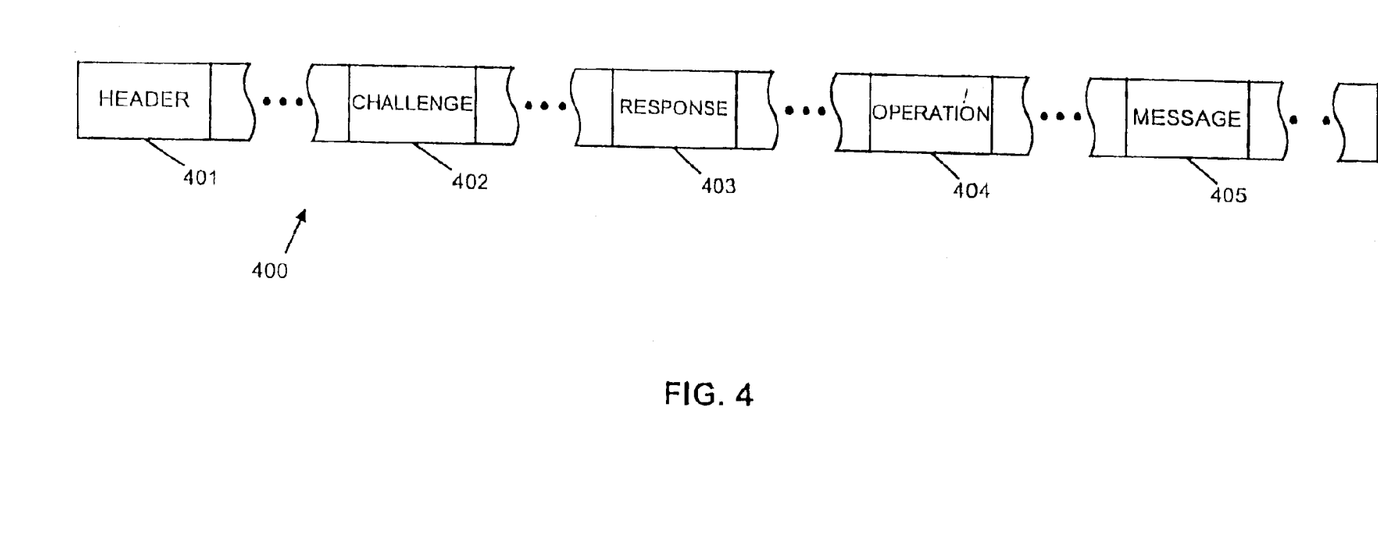
FIG. 4 is a diagram of an operating cell or packet for communication of a secure message.

FIGS. 3 and 4 are diagrams representing, respectively, a cell or packet carrying a secure registration message and a cell or packet for communicating other secure messages in an ATM or other communications network, such as an Internet protocol network. Packet-based transmission of information is known and explained, for example, in Jeffery K. MacKie-Mason & Hal R. Varian, "Economic FAQs About the Internet," Computer Based Learning Unit, University of Leeds (June 1995), which is incorporated herein by reference.

FIG. 3 represents a registration cell or packet 300 for secure messaging. It includes a header 301 identifying the destination of the packet, for example a VP/VC in an ATM network, an IP address, or an MPLS label. An identification (ID) field 302 contains information identifying a module sending a packet so that the module may register itself with a network device or server. The server is accessed either on a well known address or via a proxy directory server on a well known address. Note that servers may register with each other and with directory servers. ID field 302 may include additional information concerning the module, such as a serial number. Field 303 includes a challenge, further explained below, used to perform secure messaging. An optional message field 304 may include information identifying any type of message, such as a message stating status information.

FIG. 4 represents an operating packet 400 for secure messaging of messages sourced by a module. It includes a header 401, usually identifying the source of the packet. This identification may be indirect, for example in an ATM network the VP/VC may be associated with a specific source. An ID field may identify the packet's source if the header does not. A challenge field 402 includes the next challenge. A response to this challenge is sent back to the module that transmitted a registration or other packet. A response field 403 includes a response to a previous message. An optional message field 405 may include information identifying any type of message, such as a message confirming the receipt of a response. The same message structure can be used for messages from a server to a module. In this case the header and optional ID field identify the server, and the module sends the response to the server.

An operation field 404 may include a command for a module or device to perform a particular function. Examples of operations include resetting the module, reading a register in or a status of the module, or informing a network server of a module event such as a power failure, a central processing unit lockup, or loss of a communication link. Operation field 404 typically contains codes corresponding to operations for a particular module, and these codes are usually known for each module. Alternatively, a module may transmit the codes corresponding to its operations to a server. The source of the message can be a processor or supervisory hardware, for example. In the above description, operation field 404 is treated as distinct from message field 405 but in principle the operation field could be a specific form of, or included in, the message field.

Secure Messaging Process

A method consistent with the present invention for performing secure transmission of a message from a module may include the following (registration/initialization) steps. The server receives a first security message, including a first challenge, from a module. The server generates a first response based upon the first challenge. It then transmits a second security message that includes the first response and a second challenge, to the module. If this first response is successfully validated by the module, then the module responds to the second challenge with a second response in a third security message. The third security message also includes a third challenge. The server validates the second response to complete the mutual authentication of the server and of the module.

A method for continuing secure transmission of messages between a server and a module may also include the following steps. In addition to validating the second response, the server may send a fourth security message including a third response to the third challenge. Optionally, a fourth challenge is included and the process continues. The process of sending challenges and responses may repeat itself indefinitely where an Nth security message includes a response to the challenge in the (N−1)th security message and optionally also includes a new challenge.

From the second security message onward, an operation and/or message field can be included in the security message as shown in FIG. 4. The operation and/or message field is considered authenticated and can be acted upon.

The "response" is a function of the previous "challenge", and the operation and message fields. Optionally the response may be a function of these fields and of the header and/or ID fields. For example, the response may be an exclusive OR of a cryptographic operation involving the previous challenge, and the result of a cyclic redundancy check (CRC) calculated over the operation and message fields. Examples of cryptographic operations are described further. Alternatively the CRC could be replaced by a message digest (MD) calculated over the referenced fields. Methods to calculate message digests are described in "Computer Networks" Andrew Tanenbaum, ISBN 0-13-3499456, which is incorporated herein by reference.

A similar method consistent with the present invention for performing secure transmissions between a server and a module may be initiated by the server.

Figure 5:
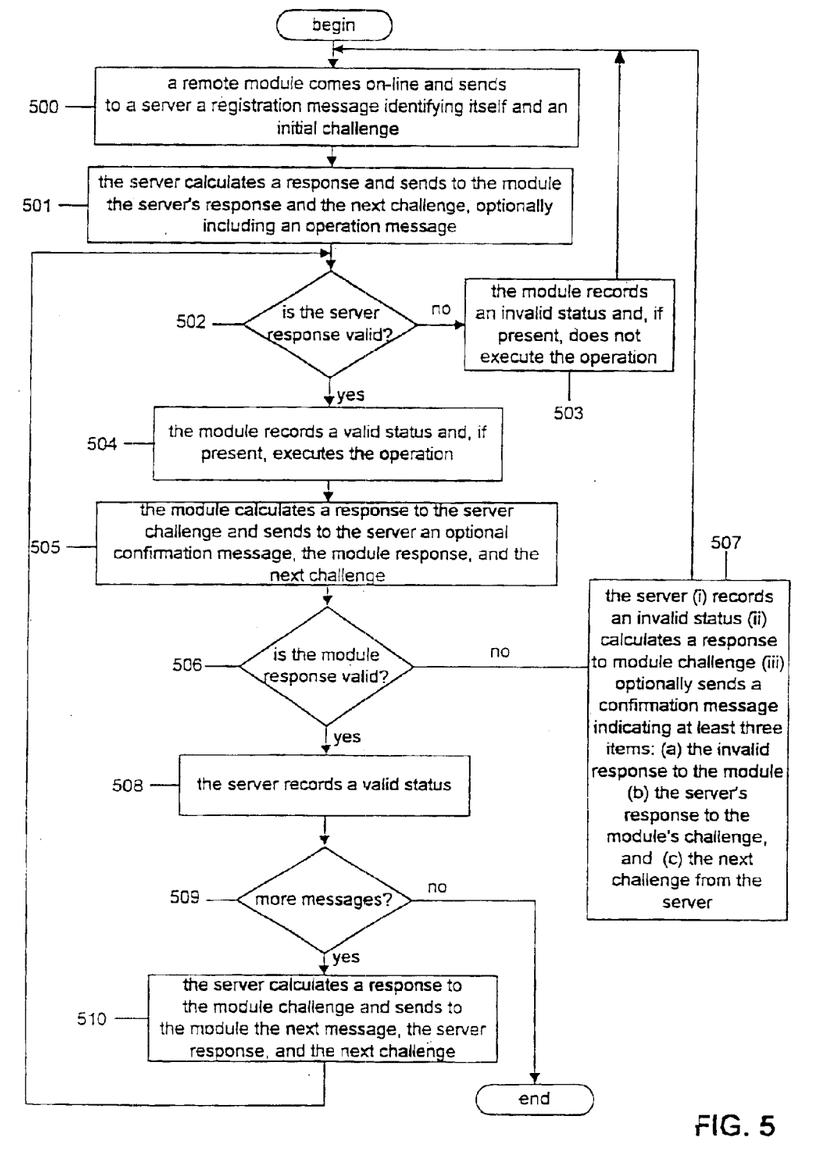
FIG. 5 is a flow chart of a representative process for secure messaging.

FIG. 5 is a flow chart illustrating these processes for secure messaging. A remote module first comes on-line, or otherwise joins a network, and sends a registration message, identifying itself and an initial challenge (step 500), to a server or other device. The 6, registration message may be sent using a cell or packet, such as cell 300 (see FIG. 3). This initial challenge usually includes a random number. The server then calculates a response to the challenge. Responses are typically calculated using the challenge, a private key in a secret key algorithm (such as DES or CAST) or the private key in a in a public key algorithm (such as RSA), and an encryption algorithm or cryptographic operation. Thus, the responses are usually numbers having a mathematical relationship to the challenge and the private key value. Any type of encryption algorithm may be used to determine the responses and next challenges. Examples of encryption algorithms are described in the following documents, incorporated herein by reference: Burton S. Kaliski Jr., "An Overview of the PKCS Standards," An RSA Laboratories Technical Note (Nov. 1, 1993); Carlisle M. Adams, "Constructing Symmetric Ciphers Using the CAST Design Procedure," Entrust Technologies, Ottawa, Canada; William Stallings, "Cryptography and Network Security, Principles and Practice," ISBN 0-13-869017-0.

The server and remote module may locally store the private keys for use in verifying the validity of responses to challenges. A valid response authenticates the identity of the responder. The server and remote module may periodically change the keys to further enhance security. The server or module may also encrypt the fields, or a subset of the fields, described with respect to the messages shown in FIGS. 3 and 4. The server and remote module may use a software or hardware subroutine locally to implement an encryption algorithm. For example, when a device or module receives a challenge it may send the challenge to an encryption subroutine for determining a response.

An encryption algorithm may also be used to determine whether a previous response to a challenge was valid. For example, a module or device may send the previous challenge and a response to that challenge to an encryption subroutine. The subroutine will determine a valid response to the challenge, compare that response with the received response, and return a pass or fail signal to the associated module or server depending upon, respectively, whether the responses match.

After receiving the registration message, the server sends its response to the initial challenge and the next challenge, which may include an operation message (step 501), to the module. The server may send this information using a cell or packet, such as cell 400 (see FIG. 4). The next challenge may be randomly generated. Therefore, the challenges may continually change to enhance security and prevent another network module from intercepting a message and inserting erroneous information into it.

The module then determines the validity of the server's response to its challenge (step 502). Upon receiving an invalid response, the module records an invalid status and does not execute any operation that may be present (step 503). The handling of error conditions, invalid status, and invalid responses is described below. On the other hand, when the module receives a valid response, the module records the valid status and, if present, executes the operation (step 504). The module then calculates a response to the server's challenge (the first "next challenge" identified above) and sends an optional confirmation message, the module response, and the next challenge to the server (step 505). The confirmation message may include an indication of the validity of the response.

Upon receiving the optional confirmation message from the module, the server determines if the module's response to its challenge was valid (step 506). The server records a valid or invalid status according to the response (steps 507 and 508). If additional confirmation messages exist (step 509), the server then calculates a response to the previous challenge and sends an optional confirmation message, the server response, and the next challenge to the module (step 510). The confirmation message transmitted by the server may include an identification of whether the module response was valid. An invalid status alerts the server that the module failed to execute an operation transmitted to it by the server. The handling of error conditions, invalid status, and invalid responses is described below relative to the discussion of FIG. 6. Steps 502–509 may be repeated as the server and module continue to transmit messages between them, as long as messages are valid (authenticated). If additional messages do not exist, processing ends.

Figure 6:
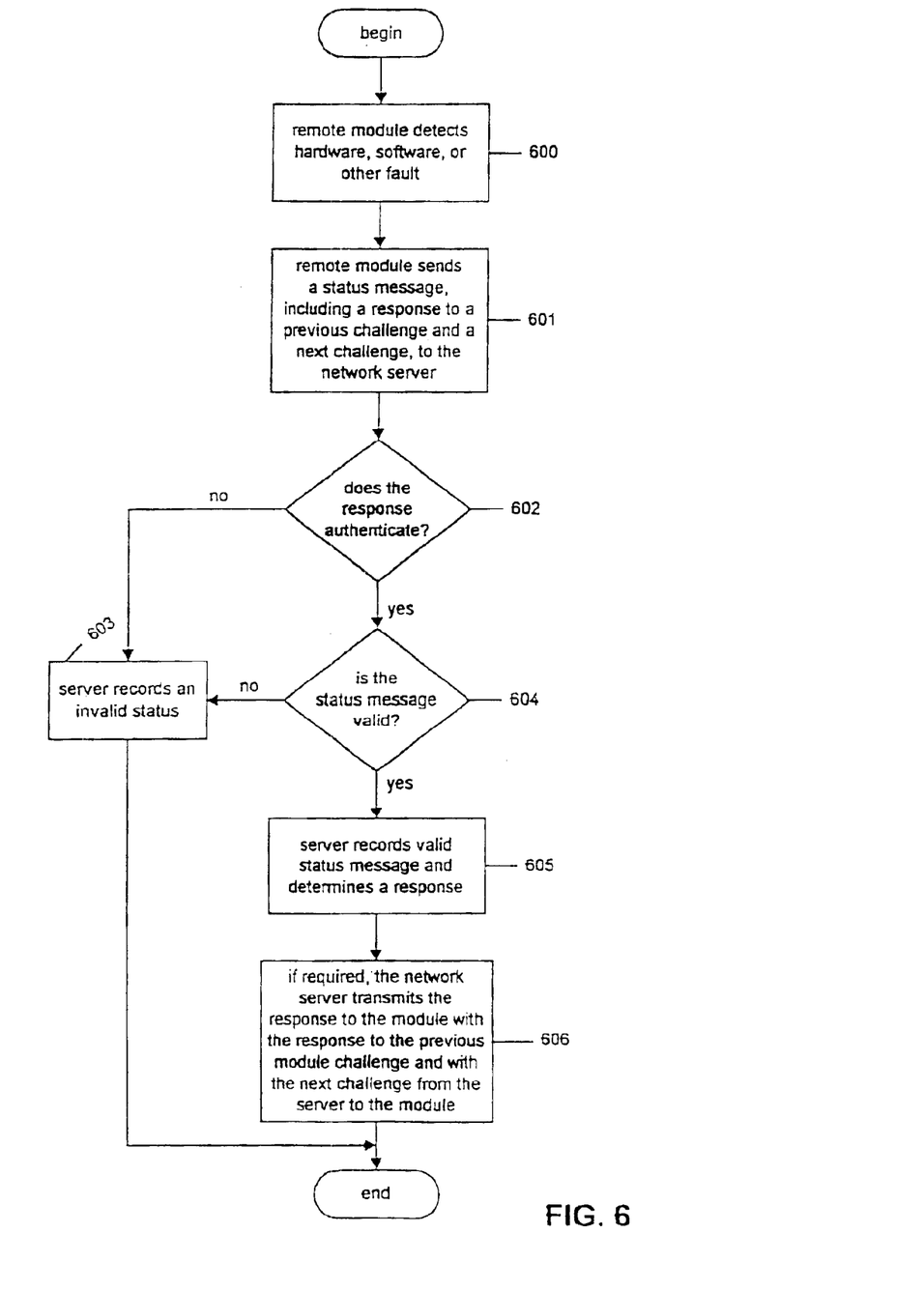
FIG. 6 is a flow chart of a process for a module generating authenticated status messages.

FIG. 6 shows a method for generating authenticated status messages in a system consistent with the principles of the present invention. A remote module first detects a hardware, software, or other internal fault, or other item requiring messaging (step 600). The remote module then sends a status message, including both a response to the server's previous authentication challenge and the remote module's next authentication challenge, to a network server or other device (step 601). After receiving the status message, the network server determines the authenticity of the response (step 602). The network server assigns non-authenticated responses an invalid status and records them accordingly (step 603). FIG. 6 can also be understood by one in the trade as a symmetric case of the server sending messages, such as a query or a command, to a module.

The handling of error conditions, invalid status, and invalid responses is described in the following paragraph. Examples of error conditions includes (i) a corrupt message which may be detected by hardware or software (ii) an invalid response to a challenge (see the discussion above describing cryptographic computation of a response). For example since the response could be a function of the message CRC then a corrupt message results in an invalid response (iii) a lack of or delay of a response e.g. a message cell or packet is discarded by the communications network due to congestion (iv) other error conditions due to hardware, software, or network conditions. The lack of a response may be detected, for example, by a timer or by a missing Keep Alive message (i.e., a continuous timer and low-rate message stream is maintained between the server and the module to ensure they are both still operational and no messages are being held back, etc). When an error conditions occurs, the connection between the server and module is considered non-authenticated and the previously described process of registration/initialization (security messages 1 to 3) is re-initiated. Possible optimizations of actions taken when error conditions are encountered involve algorithms based upon positive acknowledgment with retransmission. An example of such an optimization is a message source retransmitting a message with a new challenge upon lack of a response (as determined by a timeout). Another example is the case of a receiver receiving two consecutive messages with the same response to its challenge, i.e., duplicate messages, then the operation/message fields of the duplicated message are ignored and a response to the challenge in the duplicate message indicating "duplicate response error" is returned to the message source. Such special responses may be crafted by those knowledgeable in the art, for example to reduce communication traffic or other desired parameters, but requires special care to avoid degrading the strength of the security protocols proposed herein.

A proxy server incorporating a proxy agent may be operating on behalf of the module in any of examples described above.

Once a response has been authenticated, the network server verifies the validity of the message (step 604). Both invalid and valid status messages are recorded (steps 603 and 605). After recording a valid status message the network server performs the additional step of determining a response (step 605). When required, the network server transmits the response to the module (step 606). Steps 601–606 may be repeated each time a remote module detects a hardware, software, or other internal fault.

The processing shown in FIGS. 5 and 6 may be implemented in networks such as those shown in FIGS. 1 and 2. During the processing, servers 101 and 201 may send packets or cells to root modules 106 and 206, and modules 109 and 209 along the communication paths described above. The routing of packets or cells in a network is known in the art and is described, for example, in the MacKie-Mason & Varian document identified above.

The processing shown in FIGS. 5 and 6 may be implemented in embedded software within servers 101 and 201, root modules 106 and 206, and modules 109 and 209. It is also possible to implement the processing in hardware, a combination of hardware and software, or in software alone. For example, an encryption algorithm may be implemented more efficiently with hardware circuitry because encryption algorithms require a large amount of computational processing. The devices and modules in the network may send the messages in packets or cells having structures, for example, as shown in FIGS. 3 and 4.

In a redundant controller configuration, the processing shown in FIGS. 5 and 6 may be performed by the processor or other hardware in the controller. If the controller's processor or other hardware fails, the redundant controller can receive maintenance messages, validate and authenticate the messages, and force reset of the faulty controller.

Machines or other apparatus implementing functions described in the present specification may include computer processors for performing the functions. They may include modules or programs configured to cause the processors to perform the functions and optionally may include computer program products stored in a memory. The computer program products may include a computer-readable medium or media having computer-readable code for causing the machines or other apparatus to perform the functions. The media may also include a computer data signal embodied in a carrier wave and representing sequences of instructions which, when executed by a processor, cause the processor to securely address a peripheral device at an absolute address by performing the method described in this specification. The media may also include data structures for use in performing the functions.

While the present invention has been described in connection with a preferred embodiment, many modifications will be readily apparent to those skilled in the art, and this application is intended to cover any adaptations or variations thereof. For example, various types of modules, servers, devices, and packet or cell structures may be used without departing from the scope of the invention. This invention should be limited only by the claims and equivalents thereof.

What is claimed is:

1. An apparatus for performing secure transmission of messages between a module and a device, comprising:
    means for receiving a security message, including a challenge, from a module;
    means for determining a response based upon the challenge; and a next challenge; and
    means for transmitting the response and the next challenge to the module;

wherein the next challenge is generated by the device;

wherein the receiving means receives at least one authenticated security message from the module after transmitting the response and the next challenge; and wherein the authenticated security message includes a new challenge and at least one of an operation field and a message field.

2. The apparatus of claim 1, wherein the transmitting means includes means for including in the response, a message identifying an operation to be performed by the module.

3. The apparatus of claim 1, wherein the transmitting means includes means for including the response and the next challenge in a cell or a packet.

4. An apparatus for performing secure transmission of messages between a module and a device, comprising:

means for transmitting a security message, including a challenge, to a device;

means for receiving a next security message, including a response based upon the challenge, from the device; and means for determining a status of the next security message based upon the validity of the response;

wherein the transmitting means transmits at least one authenticated security message from the module after receiving the next security message; and wherein the authenticated security message includes a new challenge and at least one of an operation field and a message field.

5. The apparatus of claim 4, wherein the receiving means includes means for receiving a next challenge from the device, and wherein the determining means includes means for determining a next response based upon the next challenge.

6. The apparatus of claim 5, wherein the transmitting means includes means for including the identification of the status and the next response in a cell or a packet.

7. The apparatus of claim 4, wherein the receiving means includes means for receiving from the device, a message identifying an operation to be performed by the module, and wherein the apparatus further includes means for executing the operation.

8. A system for performing secure transmission of a message between a module and a device connected via a network, comprising:

a device;

a module; and an apparatus associated with the device for receiving and transmitting messages, the apparatus including means for receiving a security message, including a challenge, from the module;

means for determining a response based upon the challenge and a next challenge; and means for transmitting the response and the next challenge to the module;

wherein the next challenge is generated by the device;

wherein the receiving means receives at least one authenticated security message from the module after transmitting the response and the next challenge; and wherein the authenticated security message includes a new challenge and at least one of an operation field and a message field.

9. The system of claim 8, wherein the transmitting means includes means for including a message identifying an operation to be performed by the module.

10. The system of claim 8, wherein the transmitting means includes means for including the next challenge in a cell or a packet.

11. The system of claim 8, further including a means for implementing a root module, interfaced with the network, for routing the messages between the device and the module.

12. A system for performing secure transmission of a message between a module and a device connected via a network, comprising:

a device;

a module; and an apparatus associated with the module for receiving and transmitting messages, the apparatus including means for transmitting a security message, including a challenge, to the device;

means for receiving a next security message, including a response based upon the challenge, from the device; and means for determining a status of the next security message based upon the validity of the response;

wherein the transmitting means transmits at least one authenticated security message from the module after receiving the next security message; and wherein the authenticated security message includes a new challenge and at least one of an operation field and a message field.

13. The system of claim 12, wherein the receiving means includes means for receiving a next challenge from the device; and wherein the determining means includes means for determining a next response based upon the next challenge.

14. The system of claim 12, wherein the receiving means includes means for receiving from the device, a message identifying an operation to be performed by the module, and wherein the system further includes means for executing the operation.

15. The system of claim 12, wherein the transmitting means includes means for transmitting the identification of the status and the next response in a cell or a packet.

16. The system of claim 12, further including means for implementing a root module, interfaced with the network, for routing the messages between the device and the module.

17. The system of claim 16, wherein the apparatus is contained within the root module.

18. A method for performing secure transmission of a message between a module and a device, comprising the steps of:

receiving a security message, including a challenge, from a module;

determining a response based upon the challenge and generating a next challenge; and transmitting to the module the response and the next challenge;

wherein the receiving means receives at least one authenticated security message from the module after transmitting the response and the next challenge; and wherein the authenticated security message includes a new challenge and at least one of an operation field and a message field.

19. The method of claim 18, wherein the transmitting step includes the substep of transmitting to the module, a message identifying an operation to be performed by the module.

20. The method of claim 18, wherein the transmitting step includes the substep of including the response and the next challenge in a cell or a packet.

21. A method for performing secure transmission of a message between a module and a device, comprising the steps of:
- transmitting a security message, including a challenge, to a device;
- receiving a next security message, including a response based upon the challenge, from the device; and
- determining a status of the next security message based upon the validity of the response;
- wherein the transmitting means transmits at least one authenticated security message from the module after receiving the next security message; and
- wherein the authenticated security message includes a new challenge and at least one of an operation field and a message field.

22. The method of claim 21, wherein the receiving step includes the substep of receiving a next challenge from the device, and
- the determining step includes the substep of determining, based upon the next challenge, a next response.

23. The method of claim 22, wherein the transmitting step includes the substep of
- transmitting the identification of the status and the next response in a cell or a packet.

24. The method of claim 21, wherein the transmitting step includes the substep of
- receiving from the device a message identifying an operation to be performed by the module, and further including the step of executing the operation.

25. A computer program product, comprising:
- a computer-readable medium containing instructions for controlling a computer system to perform a method, the method including:
- receiving a security message, which includes a challenge from a module, determining a response based upon the challenge and a next challenge; and
- transmitting the response and the next challenge to the module;
- wherein the next challenge is generated by a device and the device is capable of communicating with the module;
- wherein receiving includes receiving at least one authenticated security message from the module after transmitting the response and the next challenge; and
- wherein the authenticated security message includes a new challenge and at least one of an operation field and a message field.

26. The computer program product of claim 25, wherein the transmitting step includes the substep of transmitting to the module a message identifying an operation to be performed by the module.

27. The computer program product of claim 25, wherein the transmitting step includes the substep of transmitting the response and the next challenge in a cell or a packet.

28. A computer program product, comprising:
- a computer-readable medium containing instructions for controlling a computer system to perform a method, the method including:
- transmitting a security message, including a challenge, to a device;
- receiving a next security message, including a response based upon the challenge, from the device; and
- determining a status of the next security message based upon whether the response is valid;
- wherein the transmitting means transmits at least one authenticated security message from the module after receiving the next security message; and
- wherein the authenticated security message includes a new challenge and at least one of an operation field and a message field.

29. The computer program product of claim 28, wherein the receiving step includes the substep of receiving a next challenge from the device, and the determining step includes the substep of determining a next response based upon the next challenge.

30. The computer program product of claim 29, wherein the transmitting step includes the substep of transmitting the identification of the status and the next response in a cell or a packet.

31. The computer program product of claim 28, wherein the transmitting step includes the substep of receiving from the device a message identifying an operation to be performed by the module, and further including the step of executing the operation.

32. A system for performing secure transmission of a message between a module and a server connected via a network, comprising:
- a server; and
- a module having a hardware interface capable of mutually authenticating maintenance messages sent to and received from the server;
- wherein each maintenance message is authenticated by a challenge and a response sent by the module and server.

33. The system of claim 32, wherein the hardware interface includes:
- means for transmitting a security message, including a challenge, to a server;
- means for receiving a next security message, including a response based upon the challenge, from the server; and
- means for determining a status of the next security message based upon a validity of the response.

34. The system of claim 33, wherein the hardware interface further includes means for forcing a software reset of the module.

35. The system of claim 33, further including means for transmitting an authenticated status message to a server and receiving an authenticated status message from the server.

36. The system of claim 35, wherein the means for transmitting an authenticated status message to a server transmits the authenticated status message to the server upon detection of a hardware fault in a remote module.

37. The system of claim 35, wherein the means for transmitting an authenticated status message to a server transmits the authenticated status message to the server upon detection of a software fault in a module.

38. The system of claim 35, wherein the means for transmitting an authenticated status message to a server transmits the authenticated status message to the server upon an occurrence of a timeout event in a module.

39. The system of claim 33, wherein a security message includes a maintenance message.

40. The system of claim 33, wherein the hardware interface further-includes means for forcing a hardware reset of the module.

41. A system for performing secure transmission of a message between a module and a server connected via a network, comprising:
- a server;
- a proxy agent capable of sending and receiving messages to and from the server; and
- a module capable of sending and receiving maintenance messages to and from the proxy agent;
- wherein each maintenance message is authenticated by a challenge and a response sent by the module and server.

42. The system of claim 41, further including a means for transmitting a non-authenticated status message from the module to the proxy agent upon detection of a software fault in the module.

43. The system of claim 42, further including a means for transmitting a non-authenticated status message from the module to the proxy agent upon detection of a hardware fault in the module.

44. The system of claim 43, further including a means for transmitting a non-authenticated status message to the proxy agent upon an occurrence of a timeout event in the module.

45. The system of claim 44, wherein the proxy agent receives messages from the module and performs authentication operations on behalf of the module for status messages received from the module that are destined for the server.

46. The system of claim 43, further including a means for transmitting an authenticated status message from the proxy agent to the server.

47. The system of claim 42, wherein the proxy agent authenticates the status message.

48. The system of claim 47, wherein the proxy agent transforms the authenticated status message into a non-authenticated status message and transmits the non-authenticated status message from the proxy agent to the module.

49. The system of claim 41, further including a means for transmitting an authenticated status message from the server to the proxy agent.

50. The system of claim 41, further including at least one redundant proxy and wherein a processor in the at least one redundant proxy performs validation and authentication of a maintenance message.

51. The system of claim 50, wherein the at least one redundant proxy agent includes means to receive, validate, and authenticate a message when the processor in the proxy agent fails.

52. The system of claim 50, wherein the at least one redundant proxy agent includes means to force a reset of the at least one redundant proxy when the processor in the proxy agent fails.

* * * * *